United States Patent
Coloumbe (10) Patent No.: US 7,624,811 B2
(45) Date of Patent: Dec. 1, 2009

(54) HORSESHOE CREASE STRUCTURE FOR IMPROVED TRACTION AND LOCKING ATTACHMENT NAILS

(76) Inventor: Robert W. Coloumbe, 577 Industrial Dr., Fort Erie, Ontario (CA) L2A 5M4

( * ) Notice: Subject to any disclaimer, the term of this patent is extended or adjusted under 35 U.S.C. 154(b) by 62 days.

(21) Appl. No.: 11/698,559

(22) Filed: Jan. 26, 2007

(65) Prior Publication Data

US 2007/0205003 A1  Sep. 6, 2007

Related U.S. Application Data

(60) Provisional application No. 60/762,325, filed on Jan. 26, 2006.

(51) Int. Cl.
*A01L 1/02* (2006.01)
(52) U.S. Cl. .......................... 168/23; 168/24
(58) Field of Classification Search ................ 168/23, 168/24, 4, 12, 13, 14
See application file for complete search history.

(56) References Cited

U.S. PATENT DOCUMENTS

| | | | | |
|---|---|---|---|---|
| 421,349 | A | * | 2/1890 | Bryden ........................ 168/24 |
| 553,344 | A | * | 1/1896 | Kent ........................... 168/24 |
| 556,653 | A | * | 3/1896 | Willoughby ................. 168/24 |
| 2,103,718 | A | * | 12/1937 | Goodwin ..................... 168/12 |
| 2,679,906 | A | * | 6/1954 | McGraw et al. .............. 168/24 |
| 3,288,223 | A | * | 11/1966 | Ferguson ..................... 168/12 |
| 3,340,933 | A | * | 9/1967 | McGraw et al. .............. 168/24 |
| 4,299,288 | A | * | 11/1981 | Peacock ...................... 168/23 |
| 5,004,052 | A | * | 4/1991 | Appleton ...................... 168/4 |
| 6,378,615 | B1 | * | 4/2002 | Gonsalves ................... 168/13 |
| 2002/0023760 | A1 | * | 2/2002 | Bergeleen ..................... 168/4 |
| 2004/0026093 | A1 | * | 2/2004 | Nilsson ........................ 168/6 |

FOREIGN PATENT DOCUMENTS

| | | | | |
|---|---|---|---|---|
| JP | 04036135 | A | * | 2/1992 |
| JP | 04222538 | A | * | 8/1992 |
| JP | 07236397 | A | * | 9/1995 |
| JP | 09051750 | A | * | 2/1997 |

* cited by examiner

*Primary Examiner*—Son T. Nguyen
(74) *Attorney, Agent, or Firm*—The Weintraub Group, PLC (57) ABSTRACT

An the improved horseshoe, characterized in a groove structure in the ground engaging surface of the horseshoe, wherein walls of the groove have a specific angle, width, and angular extension that cooperate to receive, center and form an interlocking engagement with the nails to attach the shoe to the hoof and also, in use, funnel earth into the groove whereby to increase traction of the horseshoe.

18 Claims, 6 Drawing Sheets

HORSESHOE CREASE STRUCTURE FOR IMPROVED TRACTION AND LOCKING ATTACHMENT NAILS

CROSS-REFERENCE TO RELATED APPLICATION

This Application claims the benefit of U.S. Provisional Application Ser. No. 60/762,325, filed on Jan. 26, 2006, the contents of which are incorporated herein by reference in its entirety for all that is taught and disclosed therein.

BACKGROUND OF THE INVENTION

1. Field of the Invention

The present invention pertains to improvements in horseshoes and in the performance of a horse resulting from the improved horseshoe when nailed to the hoof of the horse, and more particularly, to an improved groove structure in the ground engaging surface of the horseshoe wherein walls of the groove have a specific angle, width, and angular extension that cooperate to receive, center and form an interlocking engagement with the nails to attach the shoe to the hoof and also, in use, funnel earth into the groove whereby to increase traction of the horseshoe.

2. Description of the Prior Art

A properly designed horseshoe is an important piece of equipment, which can enhance the horse's racing performance and can add years to the length of the horse's racing career. When a horse is running, its hooves hit the ground with a great deal of impact.

As such, the major reasons that a horse is shod, or the purposes of a horseshoe are, to protect the horse's hooves against injury, to aid in traction, or to change the gait, balance or way a horse moves.

The horseshoe must be firmly attached to the hoof but not impair the normal circulation of the horse's hooves. As such, locating the nail receiving passages in the horseshoe relative to the ground-engaging surface of the horse's hoof and frog portion is an important consideration in the design of a horseshoe.

A traction device is anything added to a shoe to enhance or increase traction and may comprise special nails, heel calks, toe calks, grabs, jar calks, swedges, and Memphis bars, to name a few.

A swedge or crease refers to a lengthwise indentation in the web of a horseshoe, which fills with dirt and gives the horseshoe more traction than the parent material of the shoe alone. The ridges formed by the swedge may be the same height (rim shoes), higher outside (barrel racing shoes), or higher inside (polo shoes). The swedge is used to increase traction; the relative surface heights created by the swedge, to determine breakover.

A fullered shoe has a crease that starts at one heel and ends on the opposite heel and the outer and inner rims are of the same height. The crease goes all the way around the shoe. This type of shoe is also called a full swedge shoe. With the crease being so much larger the traction gain by this type of shoe is greater.

A rimmed shoe such as a barrel racing shoe has a full swedge. However, the outer rim of the shoe is higher than the inner rim. This is to facilitate greater traction in sand and dirt arenas were most barrel racing takes place.

Another widely used rim shoe is the polo shoe. It is a full swedge shoe with a higher inner rim. This is to facilitate greater traction on a turf surface. Many Farriers use a polo shoe on barrel racers, as the higher inner rim interferes less with the breakover of the hoof.

Figure 1A:
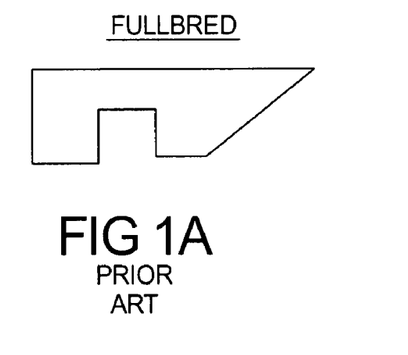
FIGS. 1A, 1B, and 1C, respectively, are cross-sections of fullered, barrel racing, and polo horseshoes, known in the farrier art, and used in different horse events or disciplines.
Figure 1B:
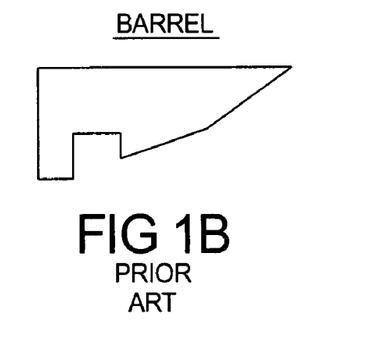
Figure 1C:
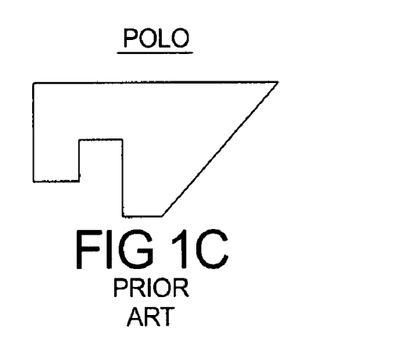

FIGS. 1A, 1B and 1C illustrate, respectively, illustrate the cross-section of a fullered, barrel racing, and polo horseshoes.

While possibly suitable for the purposes intended, these prior art horseshoes are not believed to be completely adequate in locating and locking the nails, and funneling dirt into the well of the crease (or swedge) and increase traction.

Indeed, oftentimes a minor change in the design of a horseshoe will result in a significant, and indeed unexpected, improvement in the performance of the horse wearing such horseshoe.

A design change may not only improve the performance but also lessen injuries. The impact of the hoof with the ground when the horse is running is transmitted through the shoed hoof and up through the horse's legs. Unless great care is taken to protect the horse's legs and hooves against impact, the horse can develop sore feet and lame legs due to corns, cracks, and other damage.

Further, it is known that the hooves of a horse exhibit a so-called hoof mechanism, which results in the rear half of the hoof to narrow, when the leg is lifted, and to expand, when the horse puts its leg down. A badly functioning hoof mechanism hampers blood circulation in the foot, which inhibits the formation of a health hoof. As such, the horse may experience soreness in its hooves and legs partially because a rigid horseshoe will inhibit the natural deformation of the hoof.

Accordingly, the object of this invention is the provision of an improved horseshoe that obviates disadvantages of prior horseshoes.

SUMMARY OF THE INVENTION

The present invention provides an improved U-shaped horseshoe, including a rounded toe section and a pair of arcuate wings, wherein the ground engaging surface of the horseshoe is formed, at least in part, by a pair of raised rims and at least one nail receiving passage for attaching the horseshoe to the hoof, the rims cooperating to define a truncated V-shaped groove of predetermined angular extension, the vertical widths of the groove, the vertical height and taper of the vertically facing walls of the rims, and the geometry of the inner rim of the groove being specifically configured to receive and guide the nail head, locate and pass the blade of the attachment nail into the passage, form a three-point locking engagement with the nail head, and also to receive and direct earth into bottom of the groove to improve traction when the horse is running.

Depending on the application, the groove may be continuous and extend from heel to heel, or only in each arcuate wing Further, the rounded toe section may include a calk. Depending on the hoof to which the horseshoe attaches, the extension of the toe calk from a horseshoe attached to the rear hoof is preferably greater than the extension of the toe calk from a horseshoe attached to the front hoof.

In a preferred embodiment according to this invention, a horseshoe adapted to be fitted to the hoof of a horse by an attachment nail of the type including a tapered head at one end of an elongated blade and opposite sides with one side being generally planar and the head defined by a nail locking height and an angled nail locking surface extending between the blade and the end of the nail, comprises:

an open ended ring formed of substantially solid material and defined by inner and outer side walls of U-shaped configuration with a substantially planar hoof surface and a ground surface extending between the side walls, said hoof and ground surfaces and said side walls jointly defining an arcuate toe section disposed between two elongated side sections, said ground surface molded into a traction modifying pattern characterized by an outwardly open downwardly narrowing truncated V-shaped swedge sized to receive, position, and form a three point locking engagement with the head and blade of the attachment nail and allow dirt to enter and pack into the narrowed part of the swedge to enhance traction, said swedge being defined by a substantially planar surface substantially parallel to the planar hoof surface and two swedge sidewalls, the planar surface extending between the two swedge side walls, one of the swedge sidewalls extending angularly upwardly and outwardly from the planar surface and towards the outer sidewall to form with the outer sidewall an outer rim having an outside height from the planar hoof surface, and the other of said swedge sidewalls being two-part and extending angularly upwardly and outwardly from the planar surface and towards the inner sidewall to form with the inner sidewall an inner rim having an inside height from the planar hoof surface greater than the outside height of said outer rim, the upper part of the two-part sidewall being distal to the planar surface and extending angularly away from the lower part of the two part sidewall proximal to the planar surface and towards the inner sidewall; and at least one passageway extending between the planar hoof surface and the planar surface, the swedge and passageway being sized, respectively, to receive the head and blade of said nail, said three point lock with the nail being formed by the cooperative seated engagement of said one swedge wall against the other side of said nail head, said other swedge wall engaging the angled nail locking surface of said nail head, and the passageway engaging the blade received therein.

According to this preferred embodiment, the transition between said upper and lower parts forms a knee in said two part sidewall, said knee defining one of the points of said three point lock and being located to engage the angled surface of said nail head at a location thereon calculated to be a predetermined percent of the nail locking height as measured from the intersection of the angled nail locking surface with the blade.

Depending on the discipline, meaning the sport activity of the horse, for example, thoroughbred racing, polo, or show jumping, the predetermined percent is between 40 and 90 percent of said nail locking height. In some events, the predetermined percent is about ⅔ of said nail locking height. In yet other events, the predetermined percent is about 85% of said nail locking height.

Further and according to this embodiment, the inner and outer rims are of fixed height from the planar surface with the lower part proximal to the planar surface being disposed at an acute first angle to the planar surface and the upper part distal to the planar surface being disposed at an acute second angle to the planar surface, the first angle being greater than said second angle. Depending on the discipline or type of event, for inner and outer rims of fixed height, the first angle is in the range of between 77° and 90° and said second angle is in the range of between 12° and 57°. In other disciplines, the first angle is approximately 85° and said second angle is in the range of between 16° and 50°.

In some events, the lower part of the two part sidewall projects upwardly from the planar surface and the rise thereof defines a nail lock surface height which is between 50% to 75% of the extension of the angled surface of said nail head measured from the intersection of the angled nail locking surface with the blade.

While many materials are known, preferable the horseshoe is selected from the group consisting of steel, aluminum, plastic, and composites. Depending on the discipline, the horseshoe may be comprised of tough polymers, elastomers, other metals and composites thereof.

According to a preferred aspect of this invention, and depending on the discipline, the swedge formed in the ground surface is substantially continuous and extends through the toe and side sections and between the opposite ends of the ring.

In some disciplines, the swedge formed in the ground surface extends through the side sections and between the toe section and the opposite ends of the ring. That is, each elongated side section includes a medial section that forms a transition with the toe section and terminates in a heel section, and only the ground surface of each said medial section includes a truncated V-shaped swedge.

In the latter aspect, the toe section may includes a toe calk.

In another important aspect of this preferred embodiment, the upper part of the sidewall is of a predetermined shape to enhance dirt flow into the swedge, wherein said predetermined shape is flat and planar, concave, and convex.

In one application, each said inner and outer sidewall are bifurcated and include a lower portion extending upwardly from the hoof surface and an upper portion extending angularly upwardly from the lower portion and outwardly and inwardly, respectively, towards the top of the respective inner and outer rim, the upper portion of the inner and outer sidewalls, respectively, being at an acute angle of about 49° and 75° to the ground surface.

In yet another preferred embodiment according to this invention, a horseshoe adapted to be fitted to the hoof of a horse and form a locking engagement with a shoe attaching nail of the type having an enlarged head having an angled nail locking surface extending from an elongated blade and a nail locking surface height superposed by the angled surface, according to this invention, comprises:

an open ended plate defined by inner and outer sidewalls of U-shaped configuration with a hoof engaging surface and a ground engaging surface extending between the sidewalls, said hoof and ground engaging surfaces and said sidewalls jointly defining an arcuate toe section and two elongated side sections, each of said elongated side sections extending from and terminating in a free end distal to the arcuate toe section;

said ground engaging surface including a traction modifying and nail locking structure, said structure including an inner and an outer rim projecting vertically upwardly from the hoof engaging surface and a base wall extending between the rims, said rims and base wall jointly defining an outwardly open truncated V-shaped groove in each said side section, said rims having respective vertical sidewalls disposed in faced relation with the groove sidewall formed by the outer rim facing towards the inner sidewall and extending angularly upwardly from the base to the top of the outer rim at an acute angle of about 65° to 75° to the base, and the groove sidewall formed by the inner rim facing towards the outer sidewall and extending angularly upwardly from the base to the top of the outer rim, the groove sidewall of the inner rim having upper and lower wall portions and a knee medially of the base wall and the top of the inner rim, the lower wall being at an acute angle of between 70° to 90° to the base and the upper wall being at an acute angle of between 12° to 40° relative to the crease, the knee being adapted to engage the angled surface of the nail head at a location between 40% and 60% of the nail lock surface height of the nail head as measured from the intersection of the angled surface with the blade of the nail, and a plurality of nail blade receiving passages extending between the base wall and the ground surface, the upper wall being adapted to funnel dirt into the groove to increase traction, and the groove forming a three point lock with the nail, the points being between the knee and the angled nail surface, the blade with the passage, and the flat side of the nail head with the sidewall of the outer rim.

According to the latter preferred embodiment, the lower wall of the inner rim is at an angle of about 85° to the base wall and the knee engages the angled surface of the nail head at the midpoint of the nail lock surface.

The present invention will be more clearly understood with reference to the accompanying drawings and to the following Detailed Description, in which like reference numerals refer to like parts and where:

DETAILED DESCRIPTION OF THE PREFERED EMBODIMENT

Figure 2:
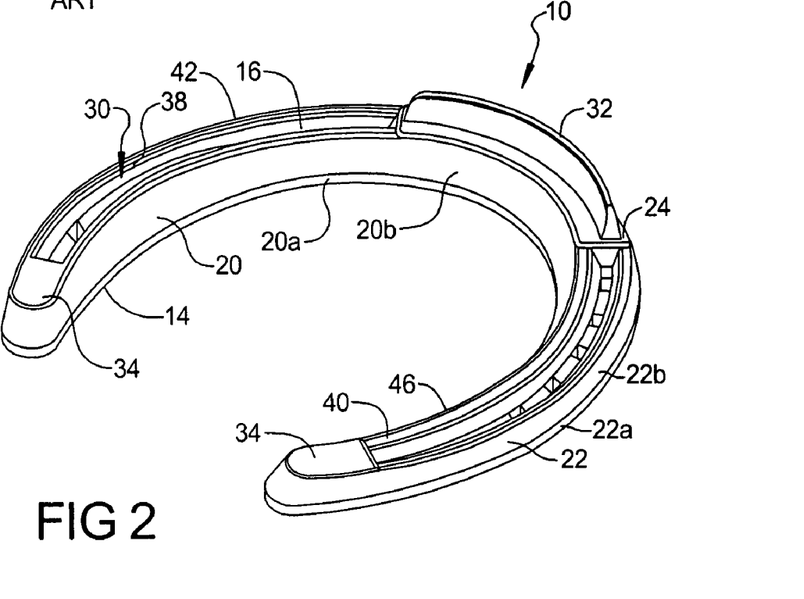
FIG. 2 is a perspective view of a preferred embodiment of the ground-engaging surface of a horseshoe, according to this invention, adapted to be nailed to the back hoof of a horse, the ground engaging surface including a traction modifying and nail locking crease structure specially configured to form a three point lock with the attachment nails and funnel dirt into the crease to improve traction.
Figure 3:
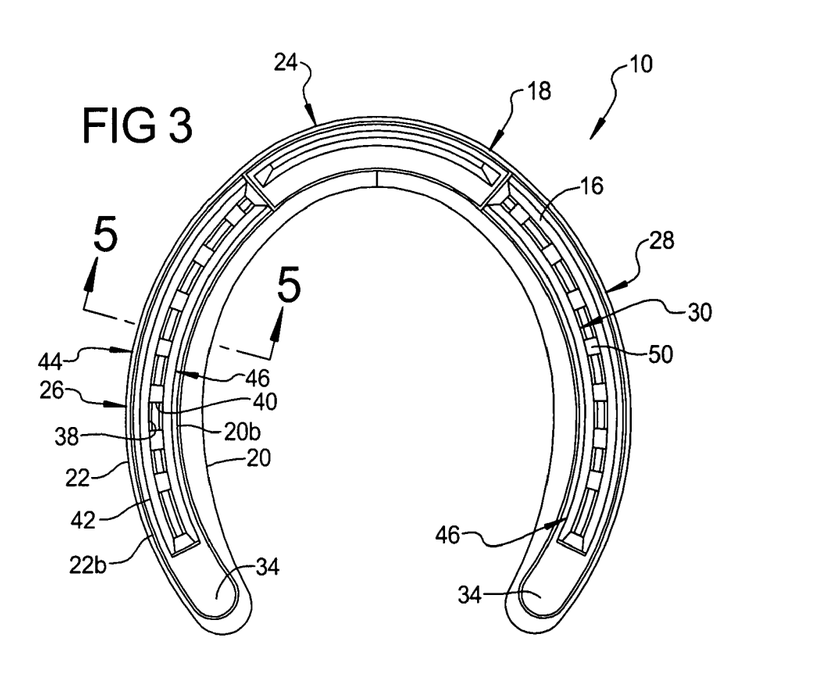
FIG. 3 is a plan view of the ground engaging surface of the horseshoe shown in FIG. 2 illustrating a calk in the toe section, a crease structure in each wing section of the shoe, and a closure member at each end of the wing closing the crease structure.
Figures 6A, 6B:
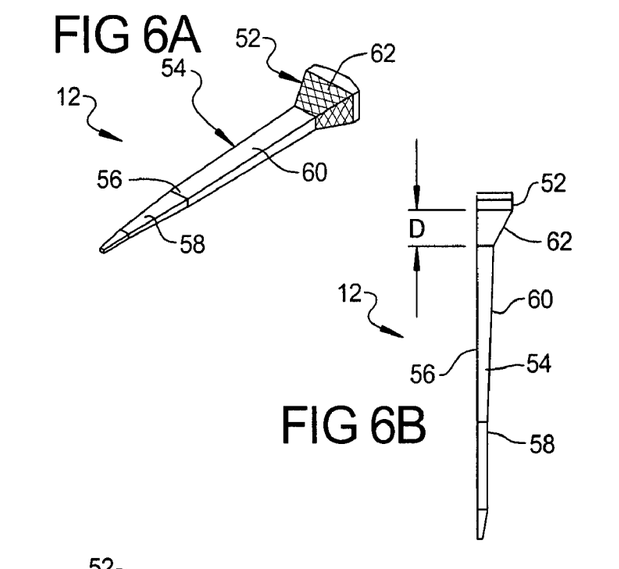
FIGS. 6A, 6B, and 6C, respectively, are perspective, side, and plan views of an attaching nail.
Figure 6C:
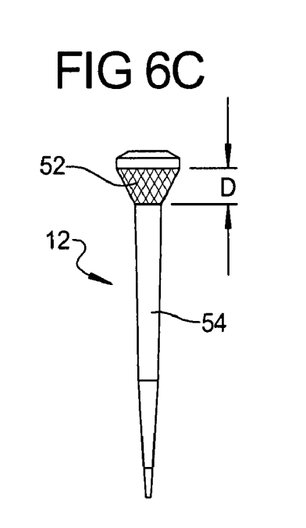

Turning now to the drawings, FIGS. 2 and 3 illustrate a horseshoe, generally indicated at 10, adapted to be fitted to the ground engaging bottom surface of a horse's hoof by an attachment nails 12 (see FIGS. 6A-6C). The actual securement of the horseshoe to the hoof is not shown as being understood by those in the farrier art.

The horseshoe 10 includes an upper surface 14, which is fixed, in use, against the bottom surface or sole of the hoof and a lower surface 16, adapted to engage the ground. The upper surface 14 is generally flat (or planar) and adapted to conform to the ground engaging bottom surface of the hoof and enhance attachment thereto. The outer circumference of the horseshoe generally conforms to the outer circumference of the hoof.

Further, the horseshoe 10 comprises a rigid open-ended ring or plate 18 formed of substantially solid material and defined by inner and outer sidewalls 20 and 22 of U-shaped configuration. The hoof and ground surfaces 14 and 16 extend between the sidewalls 20 and 22 and the hoof and ground surfaces and side walls jointly defining an arcuate or rounded center toe section 24 between two elongated curved side sections or wings or branches 26 and 28.

The ground surface 16 is molded into a traction modifying pattern characterized by an outwardly open downwardly narrowing truncated V-shaped swedge 30 sized to receive, position, and form a three point locking engagement with the head and blade of each of a succession of spaced apart attachment nails 12 and funnel and pack dirt into the narrowed part of the swedge 30 to enhance traction. The term swedge, groove, fullered are used interchangeably herein.

Desirably, as will be understood more clearly in the description that follows, the groove design enables more dirt to be funneled into the groove and provide more cushion and traction for the horse. The earth trapped in the crease will absorb concussive forces before the horseshoe will.

In the embodiment illustrated in FIGS. 2 and 3, a swedge 30 is provided in each wing 26 and 28, each swedge extending rearwardly from the toe section 24, through a wing section, and towards a respective opposite end of the U-shaped ring. Further, a traction enhancing calk 32 is provided in the toe section 24 and the opposite ends of each swedge is closed by the toe section 24 and a respective closure 34 provided at each end of the ring.

Depending on the discipline, or racing event the horseshoe is intended to be used, the toe calk 32 used on a horseshoe secured to a front hoof of a horse is shorter than the toe calk used on a horseshoe secured to the heel of a horse. The horseshoe illustrated in FIGS. 2 and 3 includes a large toe calk and the horseshoe is adapted to be secured to the heel of a horse.

Further, depending on the discipline, the groove 30 formed in the ground surface 16 may be continuous and extend between the opposite ends (i.e., extend from heel to heel and through the toe area) of the horseshoe. In such arrangement, and as described hereinabove, the groove 30 is generally U-shaped, centrally disposed between the inner and outer sidewalls 20 and 22, and extends from the opposite ends of the ring 18, through the side sections 26 and 28 and through the center toe section 24.

The toe section may be such that the calk is omitted and the groove is continuous from through the wing sections and the toe section.

The structure of the continuous groove 30 may be such that at the opposite ends of the U-shaped ring or plate 18 the groove is outwardly open. That is, the inner and outer rims of the groove are spaced apart, form a V-shaped channel, and the respective ends of the rims form a smooth transition with the base or crease of the groove 30 and form an opening that communicates into the groove channel.

Figure 3A:
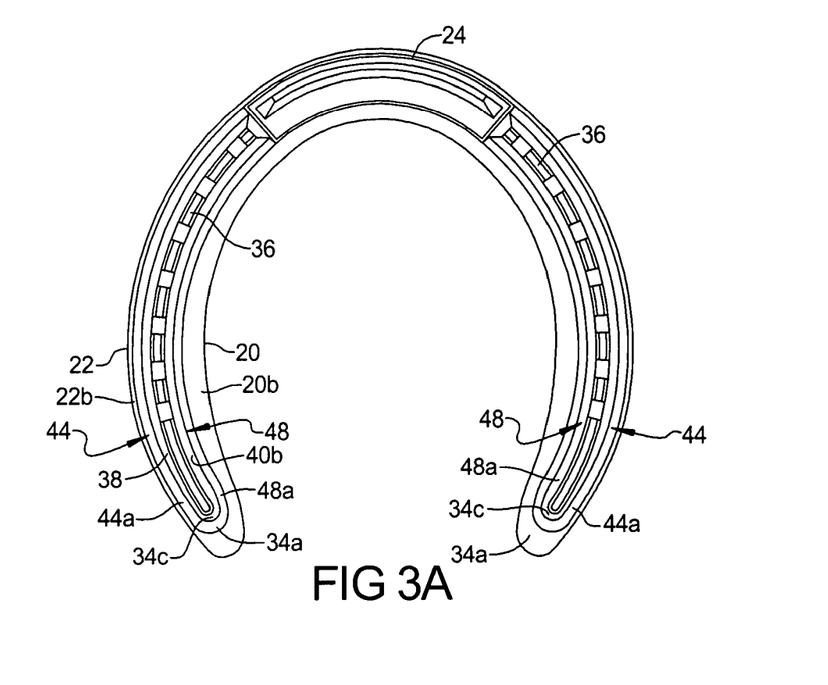
FIG. 3A is similar to FIG. 3 and is a plan view of the ground engaging surface of an alternate embodiment of a horseshoe and crease structure, according to this invention, wherein the walls of the creases formed in each wing section join together and form a rounded closure to the respective crease.

In other applications, the opposite end portions of the rims that form the groove may cooperate to form an end closure for the groove. Referring to FIG. 3A, according to an embodiment of this invention, the end closure may be formed by the end portions 44a and 48a, respectively, of the spaced outer and inner rims 44 and 48 of each V-shaped swedge 30 being joined to one another and form a rounded end closure 34a. The rim end portions 44a and 48a form an angled interior wall 34c that extends inwardly and downwardly from the top surfaces 42 and 46 of the respective rims 44 and 48 to the planar groove surface 36. The angled interior walls 34c of the closures cooperate with the angled interior wall surfaces 38 and 40b of the groove to aid in funneling and retaining earth in the groove 30.

Figure 4:
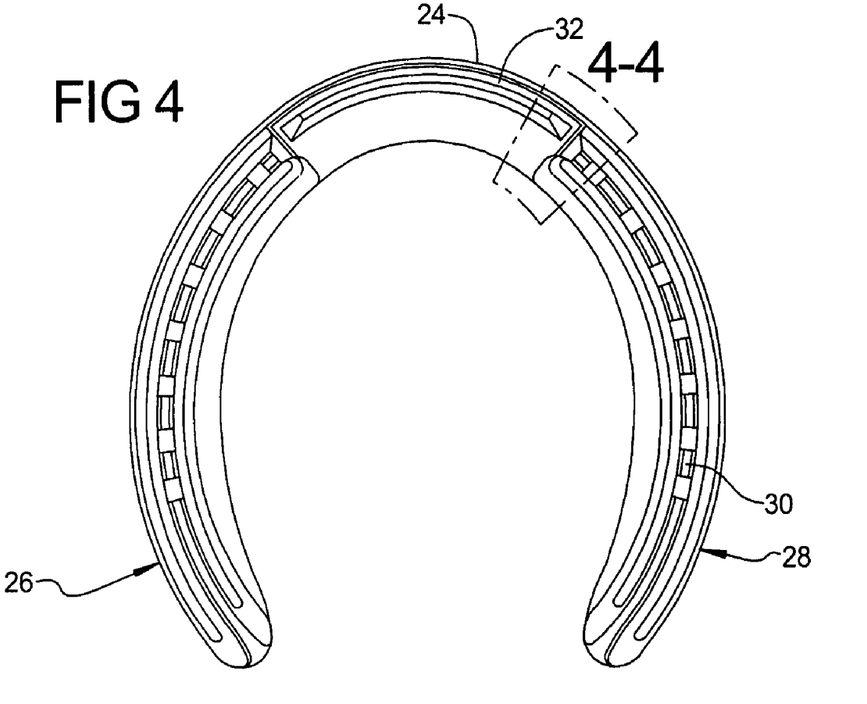
FIGS. 4 and 4A, respectively, are plan and perspective views of a modified horseshoe and one end thereof wherein the horseshoe includes a toe section, a crease structure extends from the toe section to each opposite end, and the crease structure opens and forms a smooth transition with the horseshoe surface at the ends of the horseshoe.
Figure 4A:
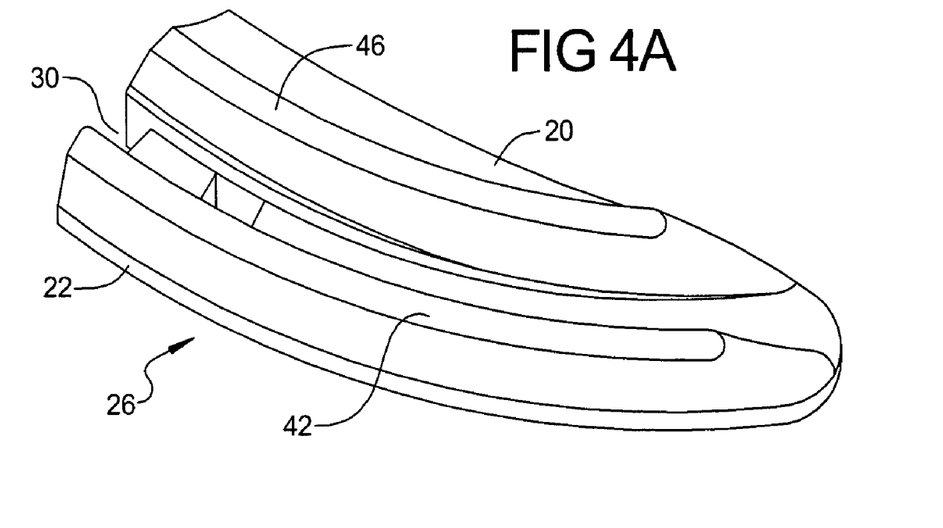

Referring to FIGS. 4 and 4A, depending on the discipline, the horseshoe includes a central toe section 24 with calk 32 and a groove 30 in each wing 26 and 28. According to this embodiment of the invention, the groove structure forms a smooth transition with the base or crease of the groove 30.

Figures 4B, 4C:
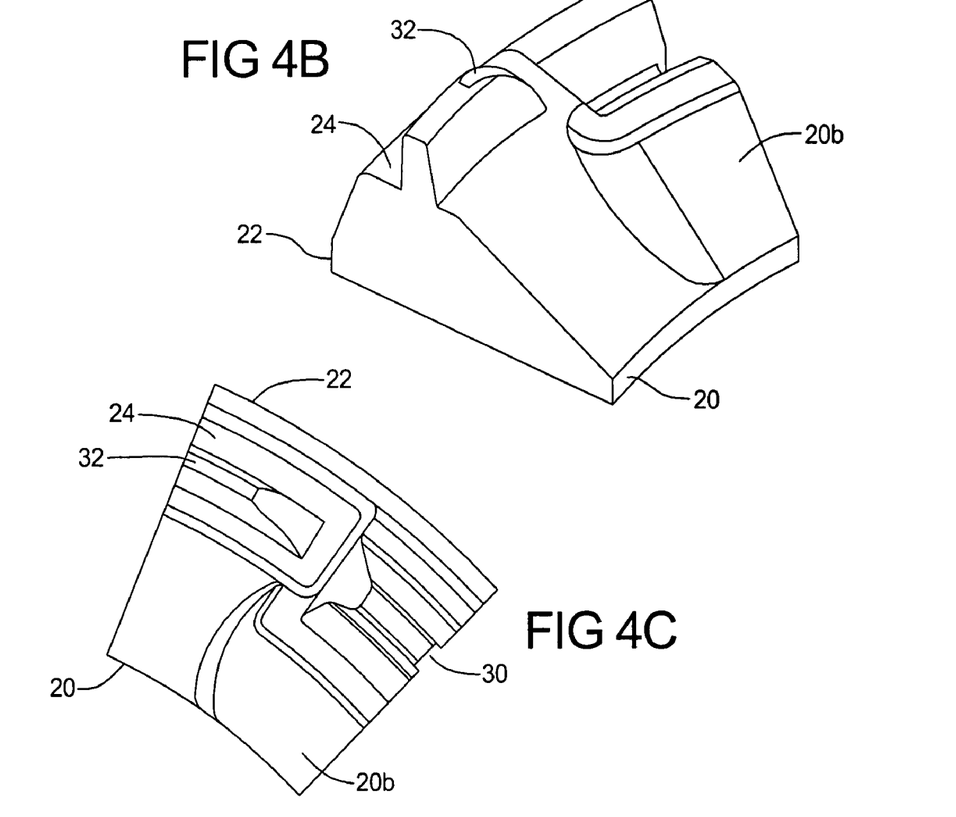
FIGS. 4B and 4C are detail views, taken about the area 4-4 of FIG. 4, illustrating detail of the transition between the toe section and the crease structure of the modified horseshoe.

FIGS. 4B and 4C show the area 4-4 of FIG. 4 and illustrate detail of the transition between the crease or groove 30 and the toe section 24. FIGS. 4B and 4C illustrate different perspectives of the inner rim top surface transition and the inner rim to toe transition. The top of inner rim to toe transition is such that the inner rim top surface area bends at 90° positioning itself to the end of the toe insert landing or island.

The inner rim to toe transition geometry stops the inside angle of the horseshoe from continuing around the toe area to have more penetrating configuration so as to penetrate ground more effectively than if the inner angle where the where to continue around the toe area which would create a larger land area behind the toe insert thus having a larger flat area at the inside of the toe landing. This larger land area would have the tendency not to penetrate the track surface or other surface as easy as the design with the inner rim toe transition.

Figure 5:
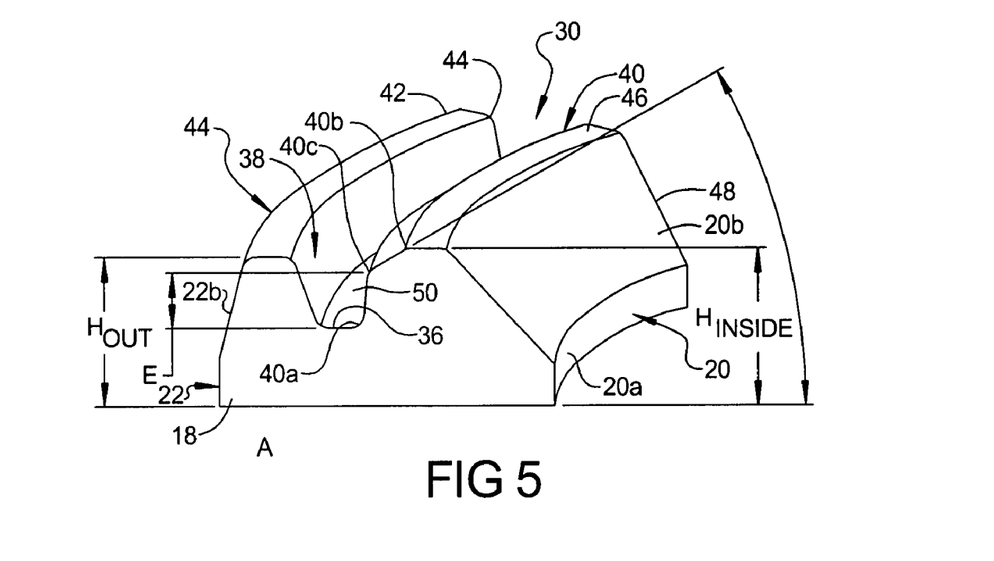
FIG. 5 is a perspective view taken along line 5-5 of FIG. 3 showing the crease structure.

According to this invention, and referring to FIG. 5, the swedge or groove 30 is defined by a substantially planar surface or base wall or crease 36 substantially parallel to the planar hoof surface 14 and two swedge sidewalls 38 and 40, the planar surface or base wall 36 extending between the two swedge sidewalls 38 and 40. The swedge sidewall 38 extends angularly upwardly and outwardly from the crease or planar surface 36 and towards the outer sidewall 22 and to a planar surface 42 to form with the outer sidewall, at least in part, an outer rim 44 having an outside height $H_{OUT}$ measured by a perpendicular between the parallel planar surfaces 36 and 42. The swedge sidewall 40 is two-part and extends angularly upwardly and outwardly from the crease or planar surface 36 and towards the inner sidewall 20 and to a planar surface 46 to form with the inner sidewall, at least in part, an inner rim 48 having an inside height $H_{INSIDE}$ measured by a perpendicular between the surfaces 36 and 46. The upward projection of the top surface 46 of the outer rim 44 is less than the upward projection of the top surface 42 of the inner rim 48. That is, $H_{OUT}$ is less than $H_{INSIDE}$.

Further, the inner and outer rims 44 and 48 are somewhat V-shaped or tooth like. The base widths and angles of the rims and the V-shaped truncated swedge or groove 30 contribute to strength and the traction of the horseshoe.

In this regard, the inner and outer sidewalls 22 and 20 that form the rims 44 and 48, at least in part, are bifurcated. Each sidewall 20 and 22 includes, respectively, a lower portion 22a and 20a that extends upwardly from the hoof surface 14, and an upper portion 22b and 20b that extends angularly upwardly from the lower portion and outwardly and inwardly, respectively, towards the top surface 42 and 46 of the respective inner and outer rim 44 and 48 and towards the opposite rim.

The upper portions 22b and 20b of the inner and outer sidewalls 22 and 20, respectively, are at an acute angle of about 49° and 75° to the ground surface 14. That is, the outer sidewall 22 is somewhat vertically disposed. However, the much smaller acute angle of the upper portion 22b of the inner rim 48 cooperates to control the direction of dirt during the pounding of the hoof on the ground and thus improve traction.

As indicated, the swedge sidewall 40 is two-part and is divided into lower and upper parts 40a and 40b by a knee 40c. Both parts extend upwardly and angularly outwardly towards the inner sidewall 20. The lower part 40a is proximal to the planar base wall or crease 36, and the upper part 40b is distal to the planar surface 36. The wall parts 40a and 40b are at acute angles to one another and the planar surface 36.

Depending on the discipline or type of event, for inner and outer rims 44 and 48 of fixed height, the angle "A" of the lower part 40a is in the range of between 77° and 90° and the angle "B" of the upper part 40b is in the range of between 12° and 57°. In other disciplines, the acute angle "A" of the lower part 40a is approximately 85° and the acute angle :B" of the upper part is in the range of between 16° and 50°.

A plurality of shaped through passages 50 extend between the base wall or crease 36 and bottom hoof surface 14, each being adapted to receive an attachment nail 12. In the horseshoe illustrated in FIGS. 2 and 3, each swedge 30 is provided with seven passages 50. The number of attachment passages may change depending on the discipline in which used. In the application wherein the toe calk is eliminated and the swedge 30 is continuous and extends through the toe section, the passages would also be provided in the toe section 24.

Referring to FIGS. 6A, 6B, and 6C, the attachment nail 12 is axially elongated and includes a tapered head 52 at the top end of an elongated blade 54, the nail having a rear side 56 and a front side 58. The rear side 56 is generally flat and planar between the top and bottom ends of the nail. The front side 58 includes a first surface 60 that tapers upwardly from the bottom end of the nail to the head 52 and forms the blade 54 and a locking surface 62 that angles upwardly from the first surface 60 and forms, in part, the head 52 of the nail. The locking surface 62, in a preferred embodiment, is at an acute angle of about 30° relative to the rear side 56. Preferably the locking surface 62 is roughened to enhance locking engagement by the knee 40c.

The head 52 defines a nail locking height "D", the axial distance measured along the rear surface and between the intersection of the locking surface 62 with the blade surface 60. Restated, the locking surface 62 of the head 52 is the hypotenuse of a right triangle, and the nail locking surface height is the leg of the triangle thereof.

According to this invention, the ground surface 16 is molded into a traction-modifying pattern characterized by the outwardly open downwardly narrowing truncated V-shaped swedge 30. The swedge is sized to receive, position, and form a three point locking engagement with the head 52 and blade 54 of the attachment nail 12 and allow dirt to enter and pack into the narrowed part of the swedge 30, proximate to the crease 36, to enhance traction.

Figure 7A:
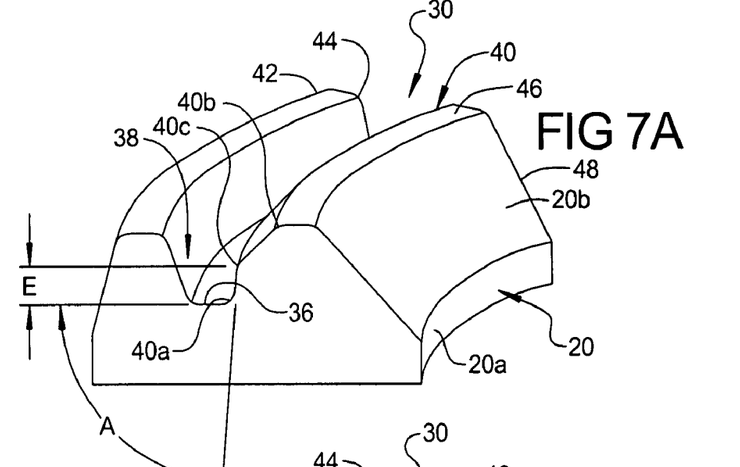
FIGS. 7A, 7B, and 7C, respectively, illustrate the crease structure as used in different disciplines.
Figure 7B:
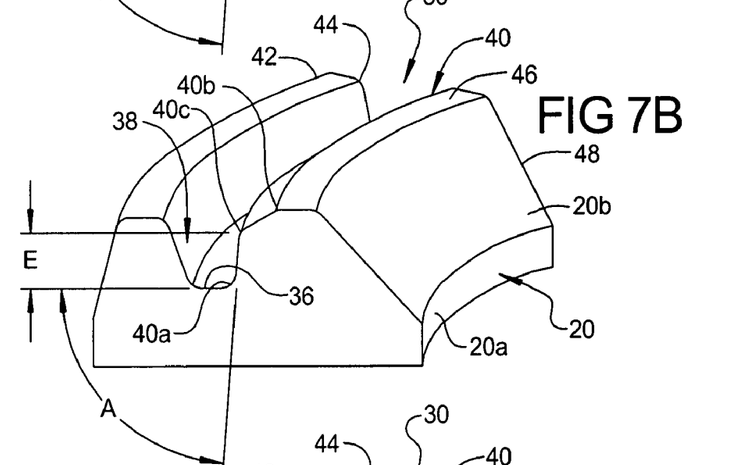
Figure 7C:
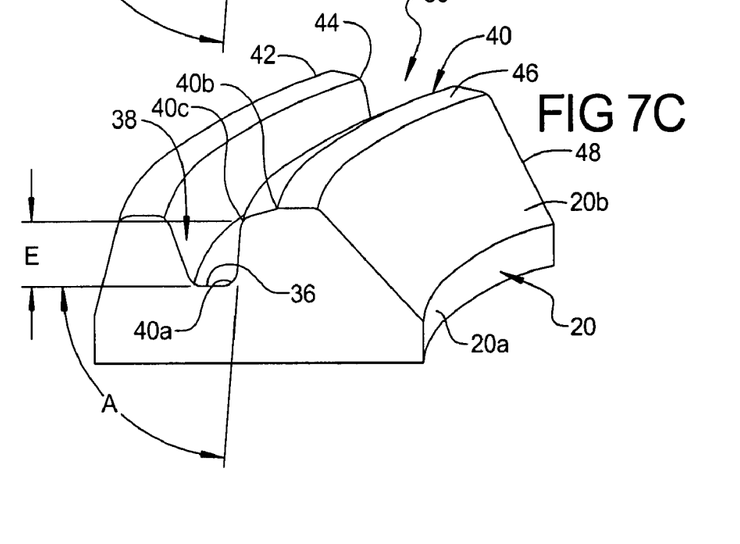

Turning to FIGS. 7A, 7B, and 7C, the narrowed V-shaped groove 30 and passage 50 extending between the plate 18 are sized and configured by their angles and dimensions to receive and lock the head 52 and blade 54 of the nail 12.

Figures 8A, 8B:
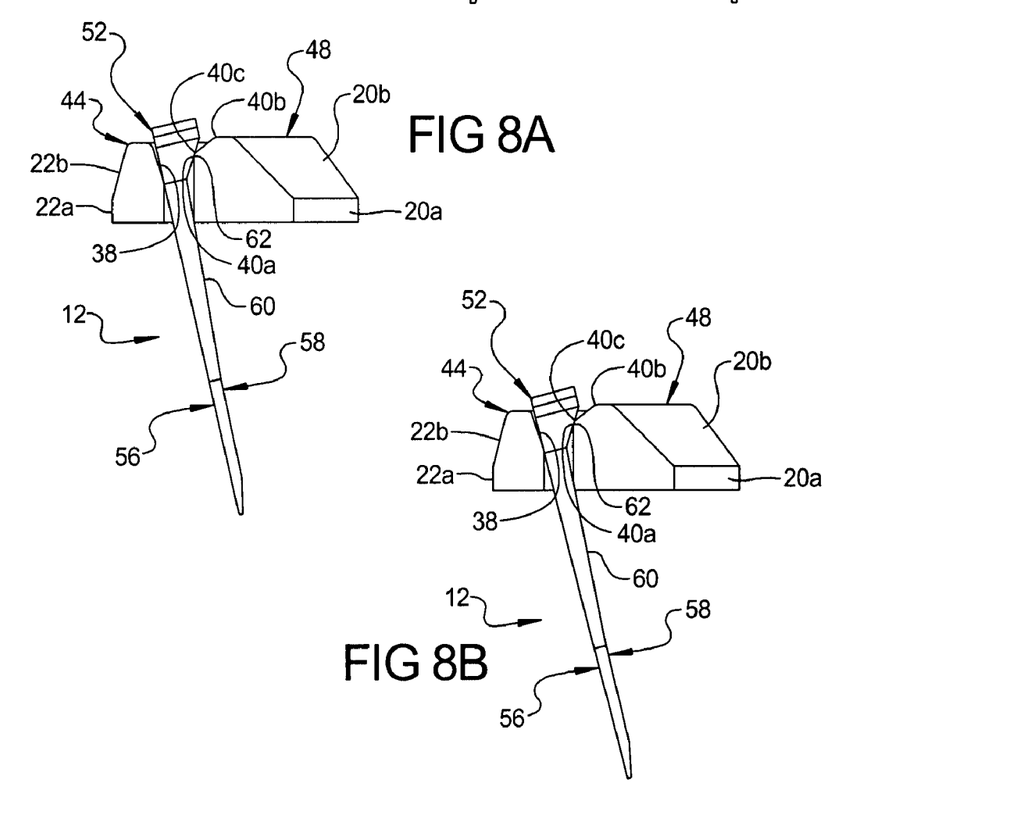
FIGS. 8A and 8B, respectively, illustrate a three-point lock between the nail shown in FIG. 6A with the crease structures illustrated in FIGS. 7B and 7C.

Turning to FIGS. 8A and 8B, the three point lock with the nail 12 is formed by the cooperative seated engagement of the outer wall 38 of the outer rim 44 against the rear side 56 of the nail head 52, the inner wall 40 of the inner rim 48 engaging the angled nail locking surface 62 of the nail head 52, and the passageway 50 engaging the blade 54 received therein.

According to this preferred embodiment, the transition knee 40c between the upper and lower parts 40a and 40b defines one of the points of the three point lock. This is referred to as the nail lock angle height "E", and is the distance upwardly along a perpendicular from the crease 36 to the knee 40c. The knee 40c is positioned to engage the angled locking surface 62 of the nail head 52 at a location thereon calculated to be a predetermined percent of the nail locking surface height.

Depending on the discipline, meaning the sport activity of the horse, for example, thoroughbred racing, polo, show jumping, or other equestrian event, the predetermined percent is between 40 and 90 percent of said nail locking surface height. In FIGS. 7A, 7B, and 7C, respectively, the predetermined percent is 40%, about ⅔ or 66%, and about 85% of the nail locking surface height "E".

As can be seen from FIGS. 7A-7C, for inner and outer rims 44 and 48 of given height, and an outer swedge sidewall 40 having a lower part 40a of about 85° to the crease wall 36, the increase in the predetermined percent causes the location of the knee 40c to be raised and the upper part 40b of the wall 40 extending between the knee and the top planar surface to become narrower. The slope angel of the upper part 40b accelerates the movement of the earth into the crease. The dimensions are shown for various of the structural elements of the horseshoes in FIGS. 7A-7C for comparison.

The horseshoe 10 is of a rigid material. While the horseshoe is preferably of a suitable steel, aluminum, plastic, and composites, other materials may be employed, such as tough polymers, elastomers, other metals, and/or composite thereof.

Advantageously, the groove and crease structure described herein can be seen to provide the farrier with a horseshoe designed to hold more earth material. The earth trapped in the crease area will absorb concussive forces before the horseshoe will. The wider opening of the groove offers more traction and more cushion to the horse because of the earth to earth contact, subsequently giving and flexing with each other while the body of the shoe stays rigid.

The foregoing description of preferred embodiments of the invention has been presented for the purposes of illustration and description. It is not intended to be exhaustive or to limit the invention to the precise form disclosed. Many modifications and variations are possible in light of the above teaching. Such modifications and variations are deemed to be within the scope if this invention.

Having thus described the invention, what is claimed is:

1. A horseshoe adapted to be fitted to the hoof of a horse by an attachment nail of the type including a tapered head at one end of an elongated blade and opposite sides with one side being generally planar and the head defined by a nail locking height and an angled nail locking surface extending between the blade and the end of the nail, comprising:

an open ended ring formed of substantially solid material and defined by inner and outer side walls of U-shaped configuration with a substantially planar hoof surface and a ground surface extending between the side walls, said hoof and ground surfaces and said side walls jointly defining an arcuate toe section disposed between two elongated side sections, said ground surface molded into a traction modifying pattern characterized by an outwardly open downwardly narrowing truncated V-shaped swedge sized to receive, position, and form a three point locking engagement with the head and blade of the attachment nail and allow dirt to enter and pack into the narrowed part of the swedge to enhance traction, said swedge being defined by a substantially planar surface substantially parallel to the planar hoof surface and two swedge sidewalls, the planar surface extending between the two swedge side walls, one of the swedge sidewalls extending angularly upwardly and outwardly from the planar surface and towards the outer sidewall to form with the outer sidewall an outer rim having an outside height from the planar hoof surface, and the other of said swedge sidewalls being two-part and extending angularly upwardly and outwardly from the planar surface and towards the inner sidewall to form with the inner sidewall an inner rim having an inside height from the planar hoof surface greater than the outside height of said outer rim, the upper part of the two-part sidewall being distal to the planar surface and extending angularly away from the lower part of the two part sidewall proximal to the planar surface and towards the inner sidewall; and at least one passageway extending between the planar hoof surface and the planar surface, the swedge and passageway being sized, respectively, to receive the head and blade of said nail, said three point lock with the nail being formed by the cooperative seated engagement of said one swedge wall against the other side of said nail head, said other swedge wall engaging the angled nail locking surface of said nail head, and the passageway engaging the blade received therein.

2. The horseshoe as claimed in claim 1, wherein the transition between said upper and lower parts forms a knee in said two part sidewall, said knee defining one of the points of said three point lock and being located to engage the angled surface of said nail head at a location thereon calculated to be a predetermined percent of the nail locking height as measured from the intersection of the angled nail locking surface with the blade.

3. The horseshoe as claimed in claim 2, wherein said predetermined percent is between 40 and 90 percent of said nail locking height.

4. The horseshoe as claimed in claim 2, wherein said predetermined percent is about ⅔ of said nail locking height.

5. The horseshoe as claimed in claim 2, wherein said predetermined percent is about 85% of said nail locking height.

6. The horseshoe as claimed in claim 2, wherein said the inner and outer rims are of fixed height, and the lower and upper parts of said two part sidewall extend angularly upwardly from said planar surface with the lower part proximal to the planar surface being disposed at an acute first angle to the planar surface and the upper part distal to the planar surface being disposed at an acute second angle to the planar surface, the first angle being greater than said second angle.

7. The horseshoe as claimed in claim 2, wherein the open ring is selected from the group consisting of steel, aluminum, plastic, and composites.

8. The horseshoe as claimed in claim 2, wherein the swedge formed in the ground surface is substantially continuous and extends through the toe and side sections and between the opposite ends of the ring.

9. The horseshoe as claimed in claim 2, wherein the swedge formed in the ground surface extends through the side sections and between the toe section and the opposite ends of the ring.

10. The horseshoe as claimed in claim 2, wherein each said elongated side section includes a medial section that forms a transition with the toe section and terminates in a heel section, the ground surface of each said medial section only including a truncated V-shaped swedge.

11. The horseshoe as claimed in claim 10, wherein the toe section includes a toe calk.

12. The horseshoe as claimed in claim 1, wherein the inner and outer rims are of fixed height, and the lower part of the two part sidewall projects perpendicularly upward from the planar surface at an angle of between 77° to 90° thereto and the rise thereof defines a nail lock surface height which is between 50% to 75% of the extension of the angled surface of said nail head measured from the intersection of the angled nail locking surface with the blade.

13. The horseshoe as claimed in claim 12, wherein said first angle is in the range of between 77° and 90° and said second angle is in the range of between 12° and 57°.

14. The horseshoe as claimed in claim 12, wherein said first angle is approximately 85° and said second angle is in the range of between 16° and 50°.

15. The horseshoe as claimed in claim 1 wherein the upper part of the sidewall is of a predetermined shape to enhance dirt flow into the swedge, wherein said predetermined shape is flat and planar, concave, and convex.

16. The horseshoe as claimed in claim 1, wherein each said inner and outer sidewall are bifurcated and include a lower portion extending upwardly from the hoof surface and an upper portion extending angularly upwardly from the lower portion and outwardly and inwardly, respectively, towards the top of the respective inner and outer rim, the upper portion of the inner and outer sidewalls, respectively, being at an acute angle of about 49° and 75° to the ground surface.

17. A horseshoe adapted to be fitted to the hoof of a horse and form a locking engagement with a shoe attaching nail of the type having an enlarged head having an angled nail locking surface extending from an elongated blade and a nail locking surface height superposed by the angled surface, comprising:

an open ended plate defined by inner and outer sidewalls of U-shaped configuration with a hoof engaging surface and a ground engaging surface extending between the sidewalls, said hoof and ground engaging surfaces and said sidewalls jointly defining an arcuate toe section and two elongated side sections, each of said elongated side sections extending from and terminating in a free end distal to the arcuate toe section;

said ground engaging surface including a traction modifying and nail locking structure, said structure including an inner and an outer rim projecting vertically upwardly from the hoof engaging surface and a base wall extending between the rims, said rims and base wall jointly defining an outwardly open truncated V-shaped groove in each said side section, said rims having respective vertical sidewalls disposed in faced relation with the groove sidewall formed by the outer rim facing towards the inner sidewall and extending angularly upwardly from the base to the top of the outer rim at an acute angle of about 65° to 75° to the base, and the groove sidewall formed by the inner rim facing towards the outer sidewall and extending angularly upwardly from the base to the top of the outer rim, the groove sidewall of the inner rim having upper and lower wall portions and a knee medially of the base wall and the top of the inner rim, the lower wall being at an acute angle of between 70° to 90° to the base and the upper wall being at an acute angle of between 12° to 40° relative to the crease, the knee being adapted to engage the angled surface of the nail head at a location between 40% and 60% of the nail lock surface height of the nail head as measured from the intersection of the angled surface with the blade of the nail, and a plurality of nail blade receiving passages extending between the base wall and the ground surface, the upper wall being adapted to funnel dirt into the groove to increase traction, and the groove forming a three point lock with the nail, the points being between the knee and the angled nail surface, the blade with the passage, and the flat side of the nail head with the sidewall of the outer rim.

18. The horseshoe as claimed in claim 17, wherein the lower wall of the inner rim is at an angle of about 85° to the base wall and the knee engages the angled surface of the nail head at the midpoint of the nail lock surface.

* * * * *